June 21, 1955 N. D. ABBEY 2,711,006
UNLOADER FOR TUBE MILLS
Filed Sept. 11, 1952 2 Sheets-Sheet 1

INVENTOR.
NELSON D. ABBEY
BY
ATTY.

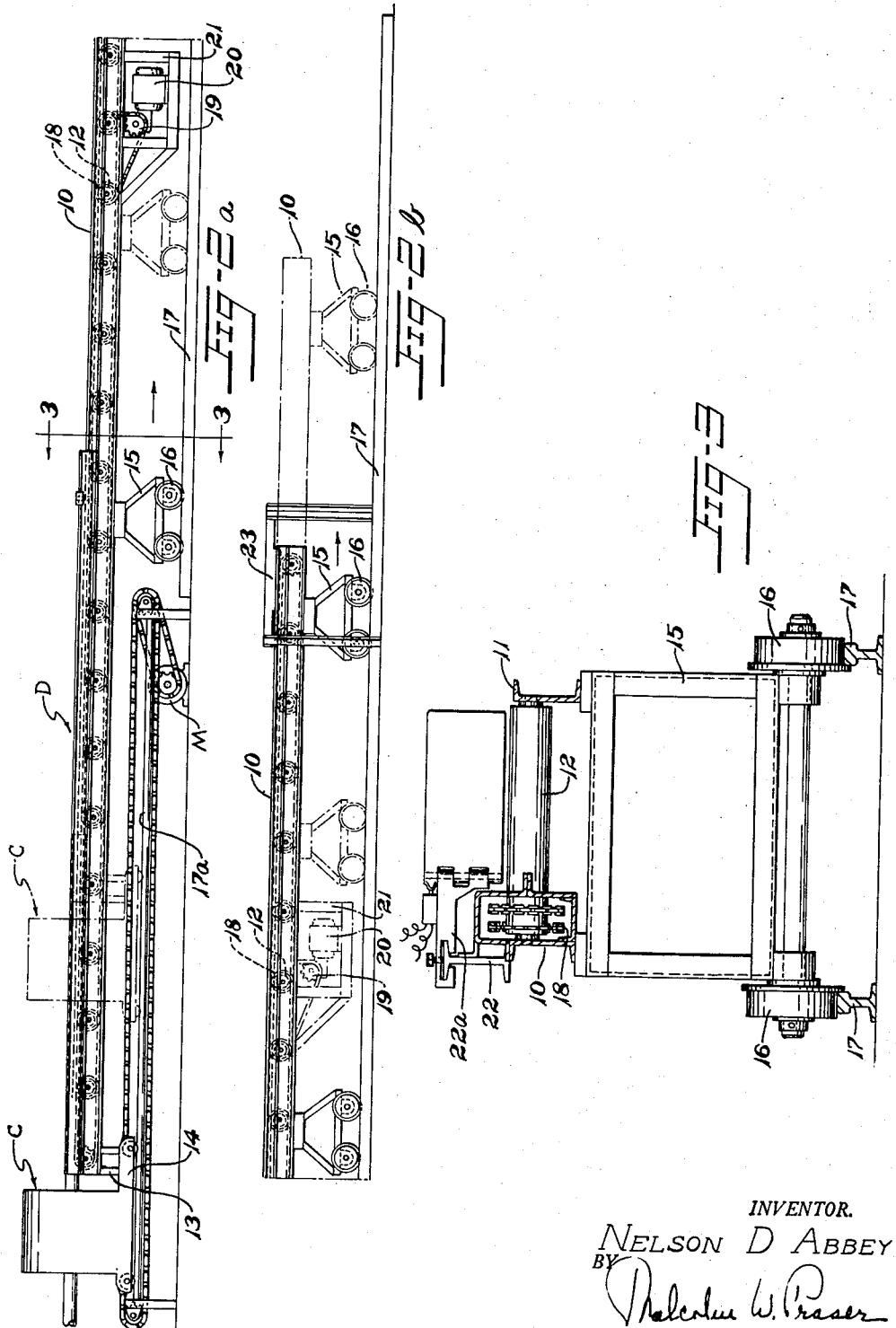

United States Patent Office 2,711,006
Patented June 21, 1955

2,711,006

UNLOADER FOR TUBE MILLS

Nelson D. Abbey, Toledo, Ohio, assignor to The Etna Machine Company, Toledo, Ohio, a corporation of Ohio Application September 11, 1952, Serial No. 309,075

6 Claims. (Cl. 29—33)

This invention relates to tube mills, but more particularly to apparatus for severing measured lengths of tube and for handling and conveying same.

In my allowed application Serial No. 739,136, filed April 3, 1947, and entitled "Tube Mill," now Patent No. 2,621,106 issued Dec. 9, 1952, there is shown and described a tube cut-off mechanism which cooperates with the tube forming mechanism so that together they constitute a tube mill capable of forming and subdividing the tubing into predetermined lengths. The cut-off mechanism travels with the tubing on a reciprocable carriage whose advancing movement is synchronized with the movement of the oncoming tubing. The cut-off is operated by separate power means automatically actuated during the advancing movement of the carriage for effecting the tube severing operation while the tube and carriage are advancing together. Thus although the tube cut-off travels with the tubing, it does not depend upon the tubing per se for its propelling force. On the contrary, the tube cut-off mechanism is advanced by power means in the form of a direct current motor coupled to a generator which is driven by the tube forming mechanism, thereby to effect the desired synchronization between the tube cut-off advance and the advancing movement of the tubing.

In a tube mill of the above character, the problem has arisen of how to handle the tubing particularly when it is desired to have severed sections of substantial length and diameter, for example, thirty feet in length, and whose weight is of considerable concern. Inasmuch as the tube mill is a continuously operating machine and the formed tubing is constantly advancing, means must be provided for efficiently and expeditiously supporting the length of the tubing in advance of the tube cut-off, obviate an overhang which would interfere with the smooth operation of the machine, and enable the severed tube sections to be properly taken care of without the necessity of manual handling thereof.

An object is to produce in association with a reciprocal tube cut-off mechanism of the above character, a new and improved conveyor or unloader mechanism which simply and satisfactorily sustains the weight of the advancing tubing, maintains it in alignment with the oncoming tubing and the cut-off mechanism, and automatically handles successive severed tube sections so that the individual sections will not interfere with the oncoming tubing nor the succeeding tube sections.

A further object is to produce an unloader translatorily movable with a reciprocal tube cut-off mechanism which has the new and improved features of construction, arrangement and operation hereinafter described.

These and other objects and advantages of this invention will hereinafter appear, and for purposes of illustration but not of limitation, an embodiment of the invention is shown in the accompanying drawings, in which Figure 1 is a front perspective view of the tube cut-off and conveyor or unloader mechanism, the same being coupled with the tube mill which is diagrammatically shown;

Figure 2a is a side elevation of the unloader mechanism and the tube cut-off mechanism to which the same is connected;

Figure 2b is a side elevation of the advanced or forward end portion of the unloader mechanism; and Figure 3 is an enlarged transverse sectional view substantially on the line 3—3 of Figure 2a.

Figure 1:
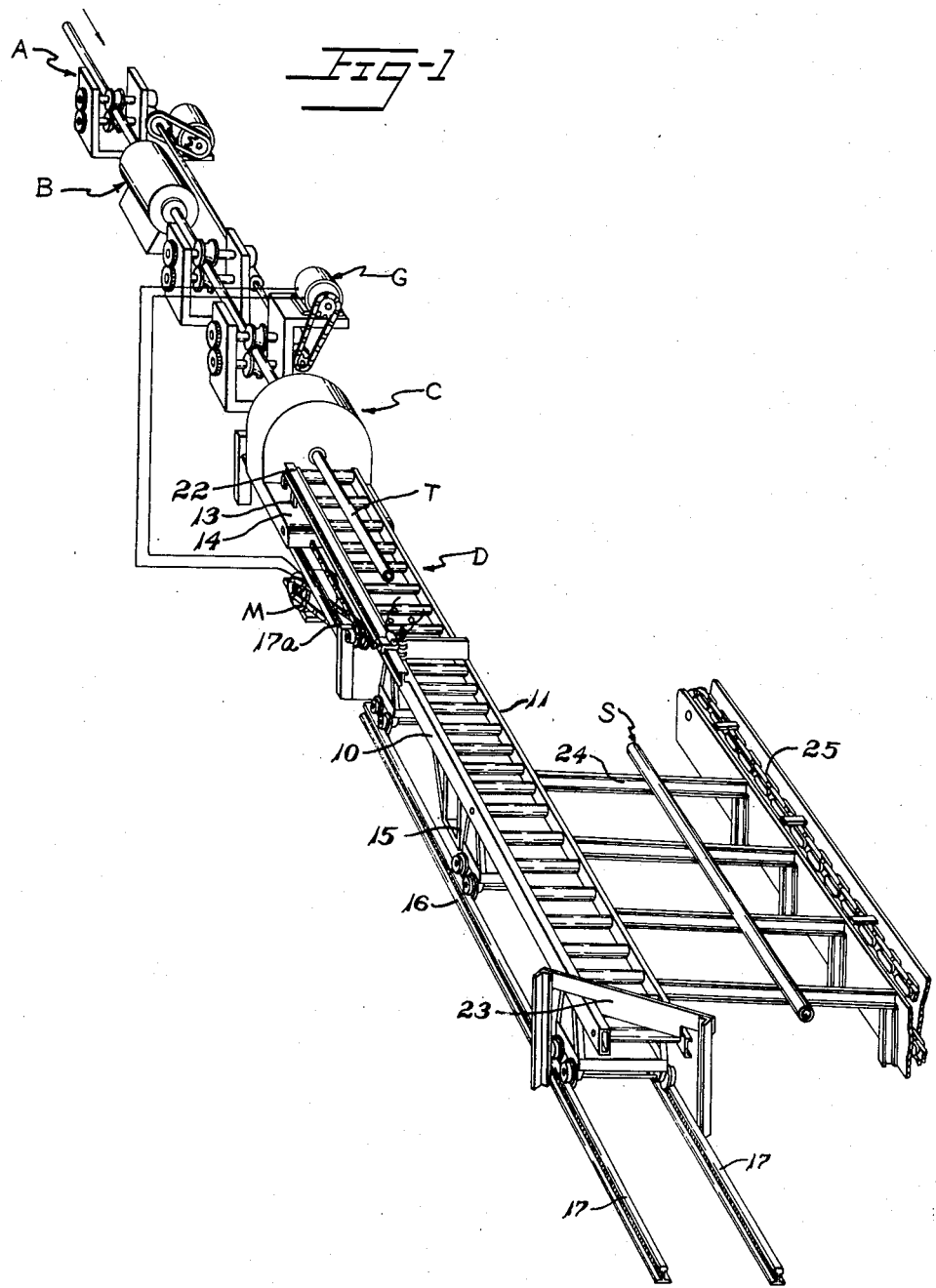

There is shown on Figure 1 of the drawings, a tube mill having a tube forming mechanism A by which a metallic strip continuously fed from a source such as a reel is formed into a tube, this action taking place progressively by a series of rolls which gradually coil the strip into a continuous tube. As the tube advances, it is fed through a welder B which may be of the electrical resistance type by which the seam in the tube is welded to form the continuous tube. As the tube in its finished form progresses from the welder B, it passes through a cut-off mechanism C by which the tube is cut into sections of predetermined length. The tubing as it passes through the cut-off mechanism, is delivered to an unloader mechanism D which is fixed to the cut-off mechanism and moves to and fro with it.

It will be understood that the tube cut-off mechanism has its own drive motor to actuate the cut-off devices so that it is a self-contained unit. Since the construction and operation of the cut-off mechanism forms no part of the present invention, detail description and illustration thereof are not considered necessary. Suffice it to say that as the cut-off mechanism advances, it encounters certain switch elements which render it operative, starting it through its cycle of operation so that as the cut-off mechanism advances with the tube, the severing operation takes place. The advancing movement of the cut-off mechanism is synchronized to that of the tube mill and this is more fully shown and described in my application above identified.

In general, it will be understood that the to and fro movements of the tube cut-off mechanism are effected by a reversible motor M which derives its energy from a generator G which in turn is suitably driven from the tube forming mechanism. Thus, if the tube forming mechanism accelerates or decelerates thereby changing the rate of the advancing movement of the tube T, the tube cut-off mechanism is accordingly accelerated or decelerated. It will be understood here that the mechanism for effecting translatory movement of the tube cut-off mechanism forms no part of the present invention so that detail description and illustration thereof are not considered necessary here.

After the tube cut-off mechanism has completed its forward advancing movement, it actuates or encounters a switch by which the motor M is caused to reverse, thereby to return the tube cut-off mechanism to its original position again to advance with the tubing and effect a succeeding severing operation.

In accordance with this invention, the unloader D is coupled to the tube cut-off mechanism C and advances and retracts with that mechanism, thus to provide the cut-off mechanism with a support for the tubing and as will hereinafter appear, the unloader enables the severed tube section S to be unloaded or discharged expeditiously and without the necessity of manual handling. The continuous tubing as it leaves the tube cut-off mechanism is supported on a series of rollers, which are preferably driven so as to assist in the advancing movement of the tubing so that not only is the tubing maintained in the desired alignment, but is also supported by rollers which are particularly effective in handling the severed section and discharging it from the unloader mechanism. The importance of this structure will be apparent when it is considered that metal tubing may be exceedingly heavy due to its diameter, wall thickness and length and in a case of high quantity production, it is imperative not only that the tubing be properly supported, but the severed sections be shifted out of the way quickly to make room for the oncoming tubing.

As shown on the drawings, the unloader comprises a pair of laterally spaced side beams, the beam 10 on one side being a box beam and the beam on the other side, designated at 11, being a U beam. Between the beams 10 and 11 is a series of rollers so arranged with relation to the outlet of the tube cut-off C that the tube is supported upon the rollers without any overhang. The side beam frame for the unloader has a fixed connection 13 with a forwardly extending platform 14 of the tube cut-off unit, such fixed connection being adjustable for height in any suitable manner. It will be apparent that the conveyor or unloader D is quite long and to support the same, there are shown three depending frames 15 on the under sides of which are pairs of flanged wheels 16 adapted to travel along the tracks 17.

Disposed within the box beam 10 on the individual rollers 12 is a pair of sprocket wheels 18 over which chains are trained so that the rollers are all driven together at uniform speeds. One of the chains is trained about a drive sprocket 19 (Figure 2a) which is operatively connected to an electric motor 20 carried by a depending motor supporting frame 21. Thus it will be apparent that the motive power for the various rolls 12 is carried by and movable with the unloader as it travels to and fro with the cut-off unit C. It will further be understood that the cut-off unit C is also mounted upon flange wheels operating on tracks 17a which are somewhat elevated above the tracks 17.

Fixed to the longitudinal beam 10 is an I beam 22 along which a target 22a is adjustable, the target being electrically connected to the tube cut-off mechanism to render the latter operative after the oncoming tube has engaged the target and established the desired electrical circuit. This is well-known and understood by those skilled in the art and detail description and illustration thereof are not considered necessary to a full understanding of this invention.

It will be understood that the rotating rolls 12 advance the severed tube section S until the latter engages the inclined deflector panel 23, thereby to cause the tube section to roll from the unloader to the downwardly inclined roll-off rails 24. The tube section S rolls by gravity down the parallel rails 24 to the chain conveyor 25 which is a constantly operating conveyor to deliver the severed tube sections to a desired location for storage, shipment or otherwise.

It is to be understood that numerous changes in details of construction, arrangement and operation may be effected without departing from the spirit of the invention especially as defined in the appended claims.

What I claim is:

1. In a tube mill, a tube cut-off mechanism mounted for to and fro translatory traveling movements, power means for effecting such traveling movements, an elongate frame fixed to and movable to and fro with the cut-off mechanism, means on said frame for supporting the tube thereon, and an ambulatory support for said frame.

2. In a tube mill, a tube cut-off mechanism mounted for to and fro translatory traveling movements, power means for effecting such traveling movements, an elongate frame fixed to and movable to and fro with the cut-off mechanism, roller means on said frame for supporting the tube thereon, means for driving said roller means for assisting the advancing movement of the tube and sections severed therefrom, and an ambulatory support for said frame.

3. In a tube mill, power driven tube forming means operative continuously to advance a formed tube, tube cut-off mechanism, means responsive to said first means for imparting advancing movement to the cut-off mechanism corresponding to the rate of movement of the tube, means for retracting said cut-off mechanism after severing a section of the tube, an unloader fixed to and movable to and fro with the cut-off mechanism, means on the unloader for supporting the tube and severed tube section, and means for discharging the severed tube section from the supporting means.

4. The organization as claimed in claim 3, in which the supporting means comprises power driven rollers, and wheeled mounting means for the unloader.

5. The organization as claimed in claim 4, comprising stationary deflector for causing the severed tube sections to be discharged laterally of the unloader.

6. The organization as claimed in claim 3, in which the unloader comprises a frame having laterally spaced longitudinal beams, rollers spanning said beams, one beam being of box structure, sprocket and chain means within said box beam for driving said rollers, and wheel mounted depending supports for said frame.

References Cited in the file of this patent
UNITED STATES PATENTS

| | | |
|---|---|---|
| 1,027,865 | Lloyd | May 28, 1912 |
| 2,334,887 | Siegerist | Nov. 23, 1943 |
| 2,335,719 | Williams | Nov. 30, 1943 |
| 2,350,975 | Rodder et al. | June 6, 1944 |
| 2,395,562 | Mansell | Feb. 26, 1946 |